(12) United States Patent
Nagao

(10) Patent No.: US 9,856,833 B2
(45) Date of Patent: Jan. 2, 2018

(54) AIR CLEANER AND VEHICLE

(71) Applicant: Yamaha Hatsudoki Kabushiki Kaisha, Shizuoka-ken (JP)

(72) Inventor: Tokinari Nagao, Shizuoka-ken (JP)

(73) Assignee: YAMAHA HATSUDOKI KABUSHIKI KAISHA, Shizuoka-Ken (JP)

( * ) Notice: Subject to any disclaimer, the term of this patent is extended or adjusted under 35 U.S.C. 154(b) by 0 days.

(21) Appl. No.: 15/468,108

(22) Filed: Mar. 24, 2017

(65) Prior Publication Data
US 2017/0284345 A1    Oct. 5, 2017

(30) Foreign Application Priority Data
Mar. 29, 2016  (JP) .................................. 2016-066550

(51) Int. Cl.
| | |
|---|---|
| B60K 13/02 | (2006.01) |
| F02M 35/024 | (2006.01) |
| B01D 46/00 | (2006.01) |
| F02M 35/04 | (2006.01) |
| F02M 35/16 | (2006.01) |

(52) U.S. Cl.
CPC ... *F02M 35/02416* (2013.01); *B01D 46/0005* (2013.01); *B01D 46/0019* (2013.01); *B60K 13/02* (2013.01); *F02M 35/048* (2013.01); *F02M 35/162* (2013.01); *B01D 2279/60* (2013.01)

(58) Field of Classification Search
CPC ... F02M 35/00; F02M 35/02416; B60K 13/02
See application file for complete search history.

(56) References Cited

U.S. PATENT DOCUMENTS 8,337,579 B2 * 12/2012 Alexander ......... B01D 46/0004
123/198 E

* cited by examiner

*Primary Examiner* — John Walters
*Assistant Examiner* — James Triggs
(74) *Attorney, Agent, or Firm* — Hubbs, Enatsky & Inoue PLLC

(57) ABSTRACT

An air cleaner includes a filter element, a case having an opening and being configured to accommodate the filter element, and a lid configured to close the opening. The case includes a wall including a first surface and a second surface that are formed on at least one of an outer surface and an inner surface of the case and are continuous with each other in an opening direction of the opening through intermediation of a stepped portion. The case further includes a rib formed on at least one of the first surface and the second surface to extend in the opening direction.

17 Claims, 12 Drawing Sheets

AIR CLEANER AND VEHICLE

CROSS-REFERENCE TO RELATED APPLICATION

The present application claims priority from Japanese application JP2016-066550 filed on Mar. 29, 2016, the content of which is hereby incorporated by reference into this application.

BACKGROUND OF THE INVENTION

A vehicle such as a recreational vehicle (RV) is often used on rough terrain where foreign matter, such as dust, is kicked up around the RV. Accordingly, an air cleaner having a larger sized case is needed to protect a surface area of a filter element.

An air cleaner case is generally a molded product typically formed by injection molding. Ribs are sometimes formed to reinforce a wall of the air cleaner case. In U.S. Pat. No. 8,337,579, an air cleaner is described having ribs formed on an inner side of a case so as to extend toward an opening of the case.

SUMMARY OF THE INVENTION

When the air cleaner case is formed by injection molding, for the convenience of releasing a die, a rib is formed into a tapered shape having a thickness that decreases as the rib extends in a die releasing direction. However, as a size of the air cleaner case is increased, the rib becomes longer and a proximal end of the rib will likewise become thicker. Thus, a strain is easily caused by sink marks, thereby making it difficult to obtain accurate dimensions for the air cleaner case. Further, when the proximal end of the rib is thickened, a molding cooling time period is extended, thereby increasing the manufacturing cost.

The present application has been made in view of the above-mentioned problems.

In one embodiment, an air cleaner includes a filter element, a case having an opening and configured to accommodate the filter element, and a lid configured to close the opening. The case includes a wall including a first surface and a second surface. The first surface and the second surface are formed on at least one of an outer surface and an inner surface of the case and are continuous with each other in an opening direction of the opening through intermediation of a stepped portion. A rib is formed on at least one of the first surface and the second surface so as to extend in the opening direction.

In one embodiment, a vehicle includes the above-described air cleaner.

According to the above-described embodiment, the rib is formed on one of or each of the first surface and the second surface. Thus, moldability of the case can be enhanced while preventing an increase in size (and thickness) of the rib.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by referencing the appended figures representing embodiments.

Figure 1:
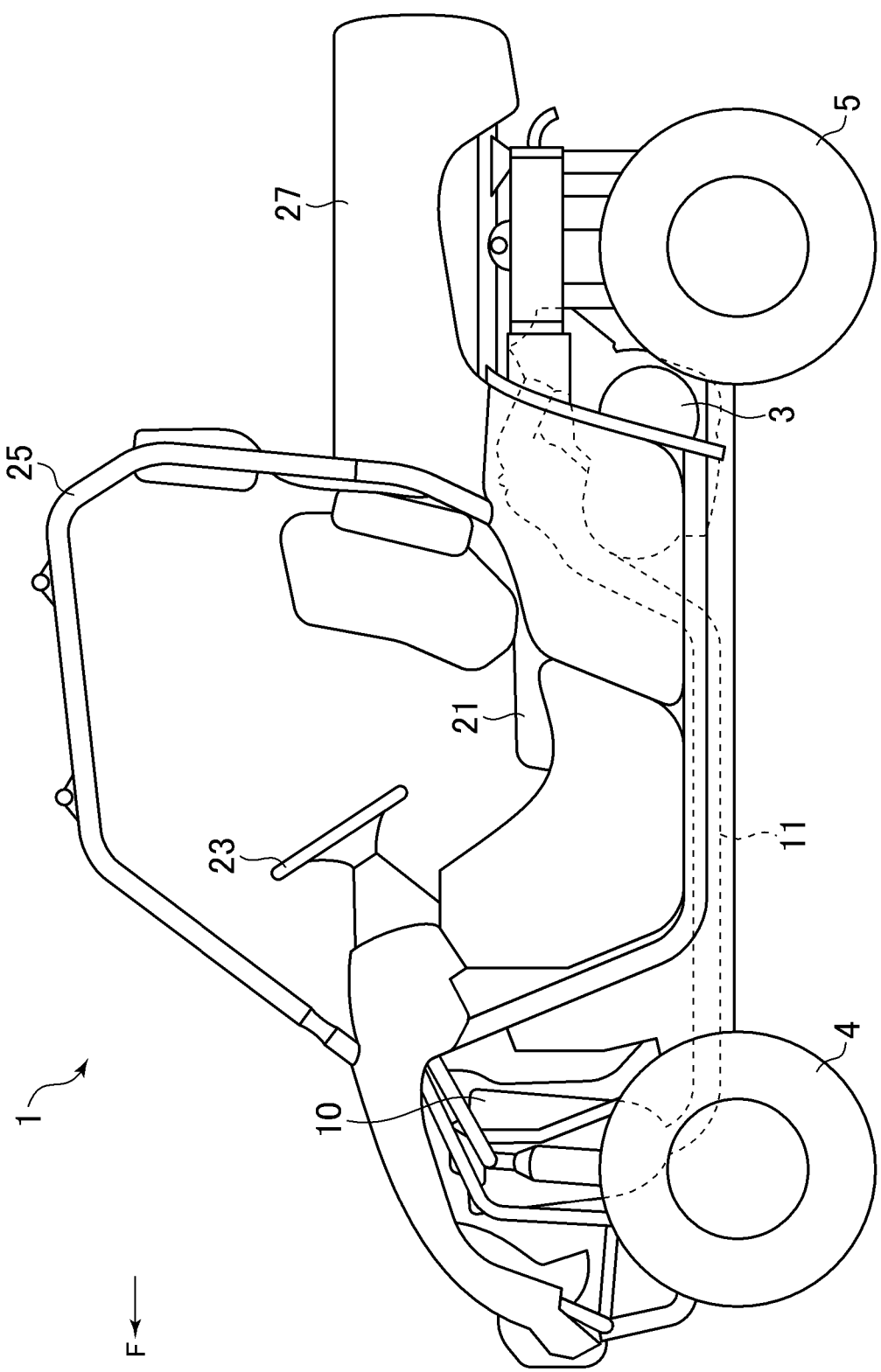
FIG. 1 is a left side view of a vehicle according to an embodiment.

FIG. 1 is a left side view of a vehicle 1 according to an embodiment. In this embodiment, the vehicle 1 is a four-wheel vehicle including a plurality of seats 21 arranged in a vehicle width direction and a steering wheel. This vehicle is called, for example, a recreational off-highway vehicle (ROV). Alternatively, the vehicle 1 may be a four-wheel straddled vehicle including a steering bar, which is called, for example, an all-terrain vehicle (ATV).

In the following description, a forward direction, a rearward direction, an upward direction, a downward direction, a leftward direction, and a rightward direction denote a forward direction, a rearward direction, an upward direction, a downward direction, a leftward direction, and a rightward direction as viewed from a driver who sits on the seat 21 and faces the steering wheel 23. The arrow F in FIG. 1 indicates the forward direction.

A pair of front wheels 4 is arranged on a lower front portion of the vehicle 1 and are spaced apart from each other in a rightward and leftward direction, and a pair of rear wheels 5 is arranged at a lower rear portion of the vehicle 1 and are spaced apart from each other in the rightward and leftward direction. The vehicle 1 includes an engine 3 configured to drive the rear wheels 5, or drive both of the front wheels 4 and the rear wheels 5. In this embodiment, the engine 3 is arranged rearward of the seat 21 on which a driver sits. The engine 3 is supported in a posture inclined so that an axial center of a cylinder is oriented toward the upper rear side.

The vehicle 1 includes a cabin frame 25 defining a space for an occupant. The cabin frame 25 is mounted so as to surround the seats 21 and the steering wheel 23 in side view. The cabin frame 25 is formed of a metal pipe made of, for example, iron or steel. A luggage rack 27 is arranged rearward of the cabin frame 25 and above the engine 3 and the rear wheels 5.

In this embodiment, the vehicle 1 includes only one row of the plurality of seats 21 arranged in the rightward and leftward direction, but the present invention is not limited thereto. The vehicle 1 may include two or more rows of the plurality of seats 21 arranged in the rightward and leftward direction. In this case, the engine 3 may be arranged below a rearmost row of the seats 21.

The vehicle 1 includes an air cleaner 10 according to this embodiment. In this embodiment, the air cleaner 10 is arranged on a front portion of the vehicle 1, for example, between the front wheels 4. Through intermediation of an intake duct 11 extending in a forward and rearward direction, the air cleaner 10 is connected to the engine 3 arranged on a rear portion of the vehicle 1. In order to reduce intake resistance, the intake duct 11 is designed so that a portion of the duct, which is located near a rear end of the duct connected to the engine 3, is increased in cross-sectional area.

Figure 2:
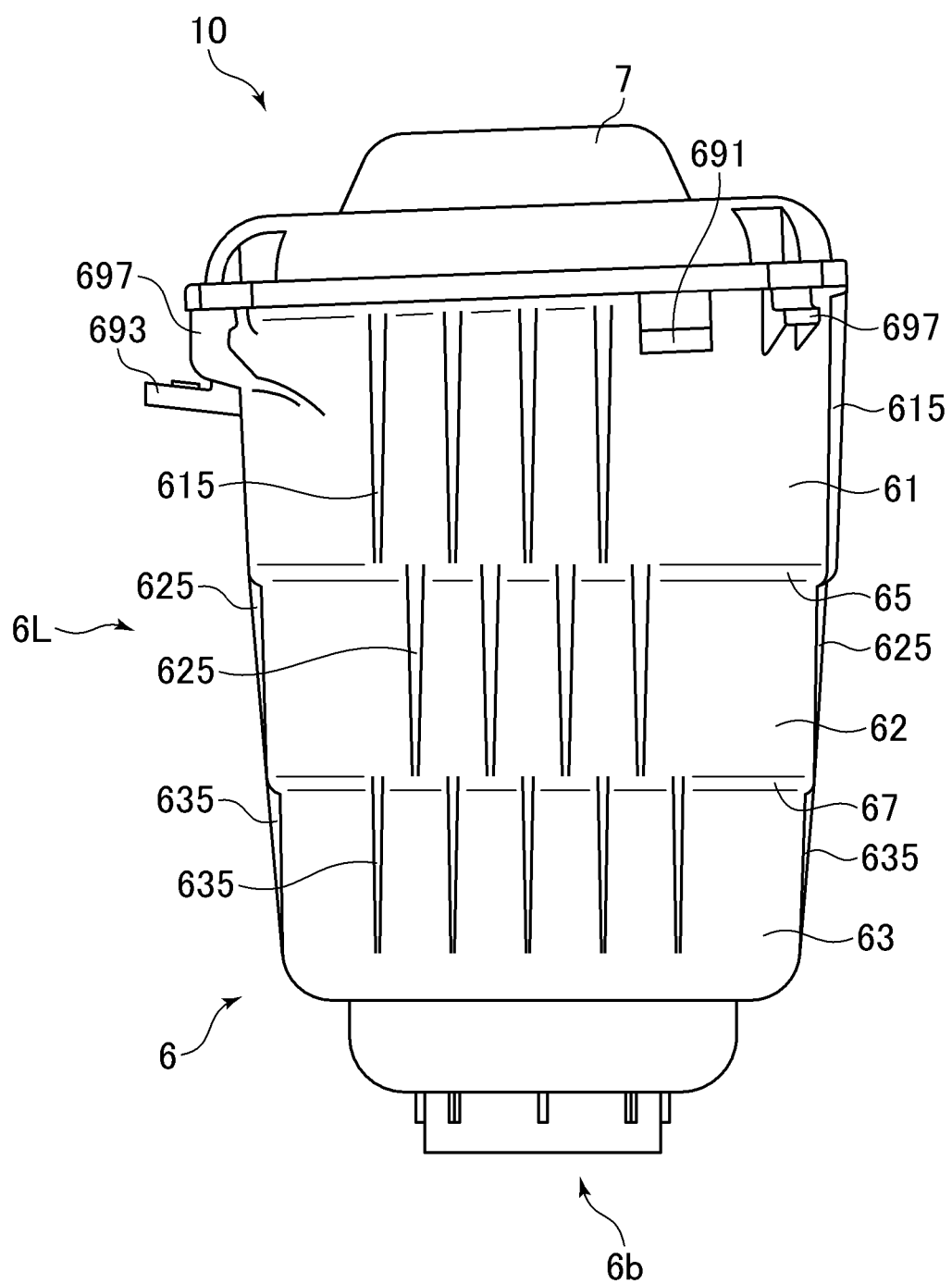
FIG. 2 is a left side view of an air cleaner according to the embodiment.
Figure 3:
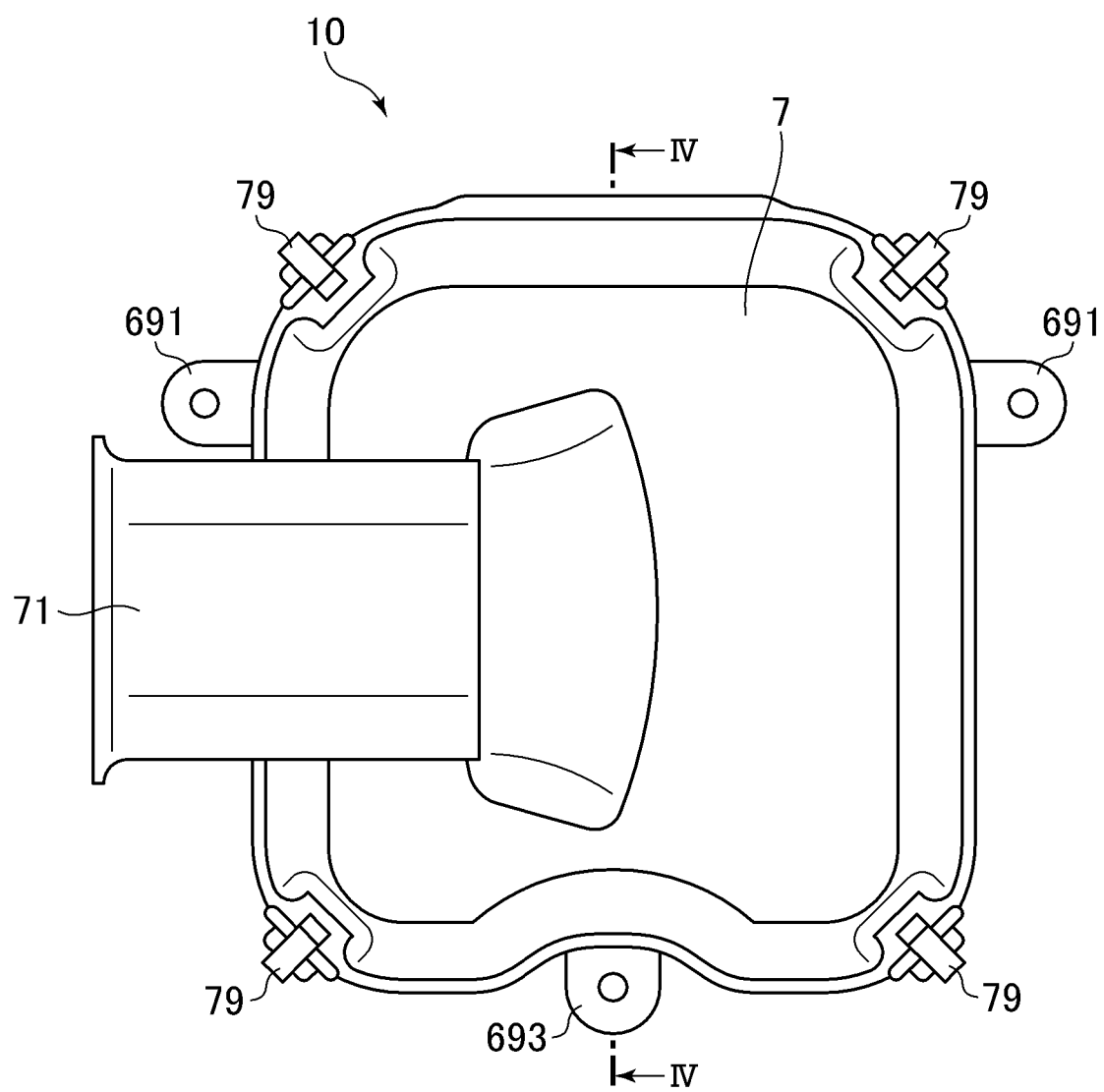
FIG. 3 is a plan view of the air cleaner.
Figure 4:
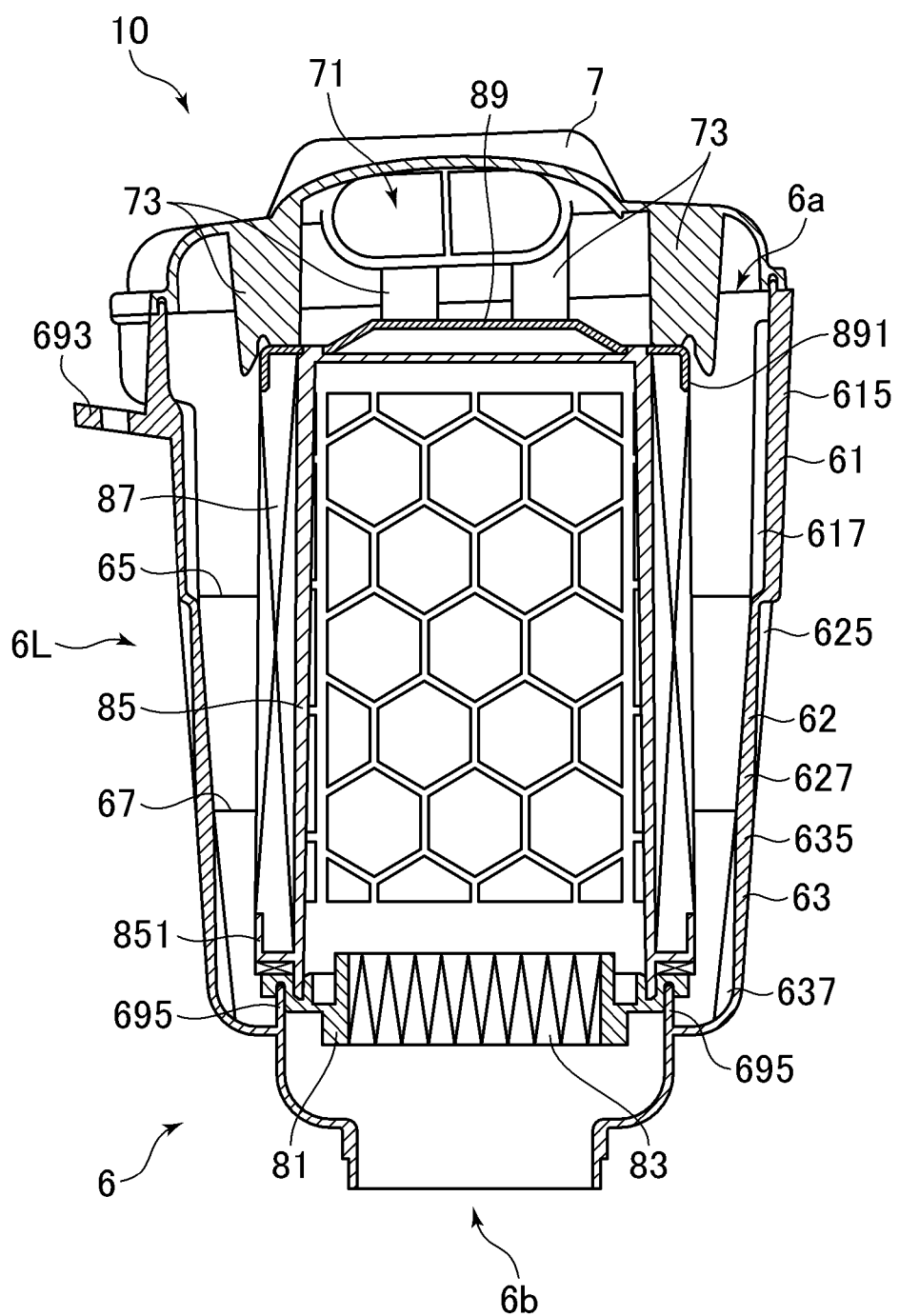
FIG. 4 is a sectional view of the air cleaner.
Figure 5:
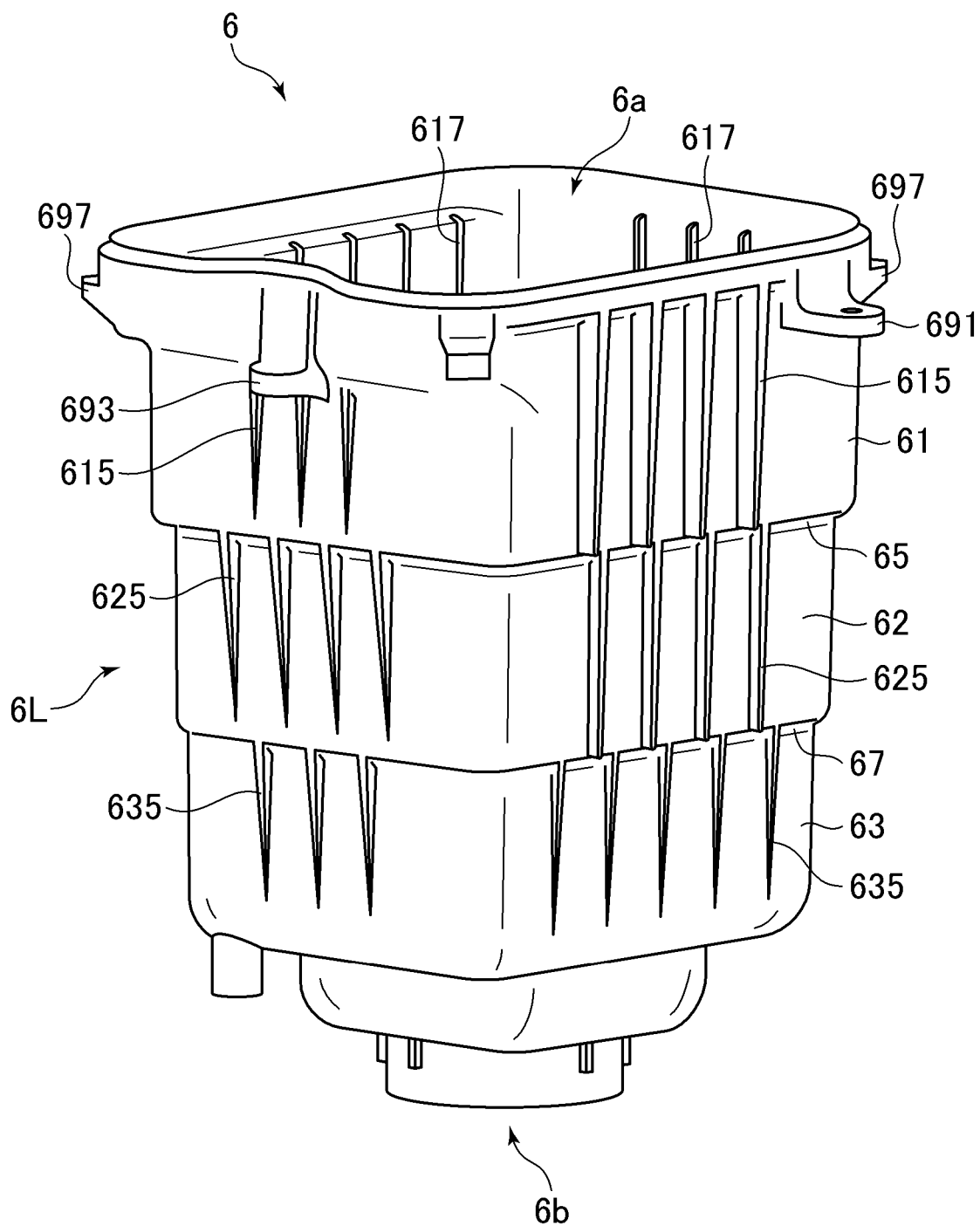
FIG. 5 is a perspective view of a case of the air cleaner.
Figure 6:
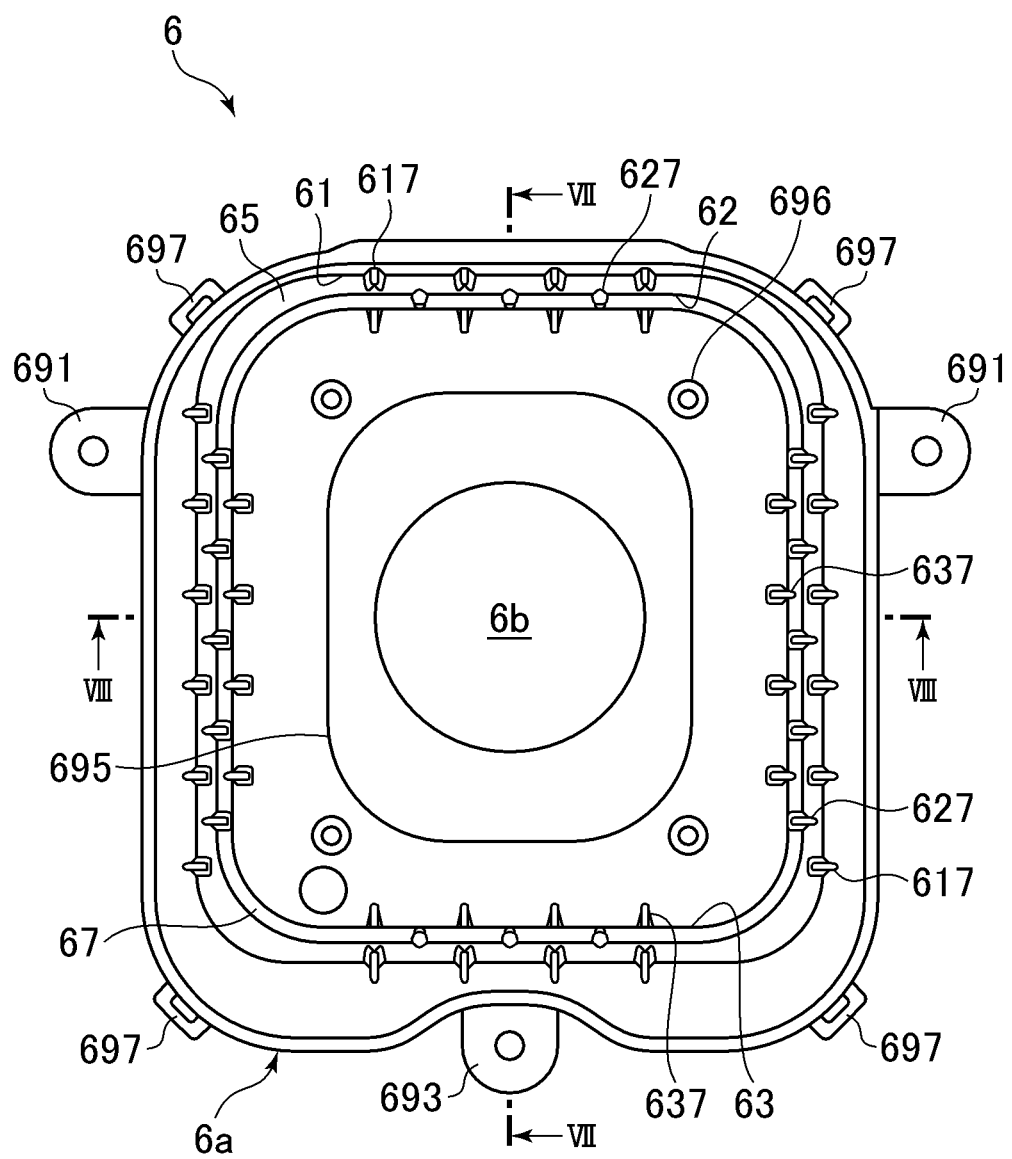
FIG. 6 is a plan view of the case.

FIG. 2, FIG. 3, and FIG. 4 are a left side view, a plan view, and a sectional view, respectively, of the air cleaner 10 according to this embodiment. FIG. 4 is a sectional view taken along the line IV-IV of FIG. 3.

Figure 7:
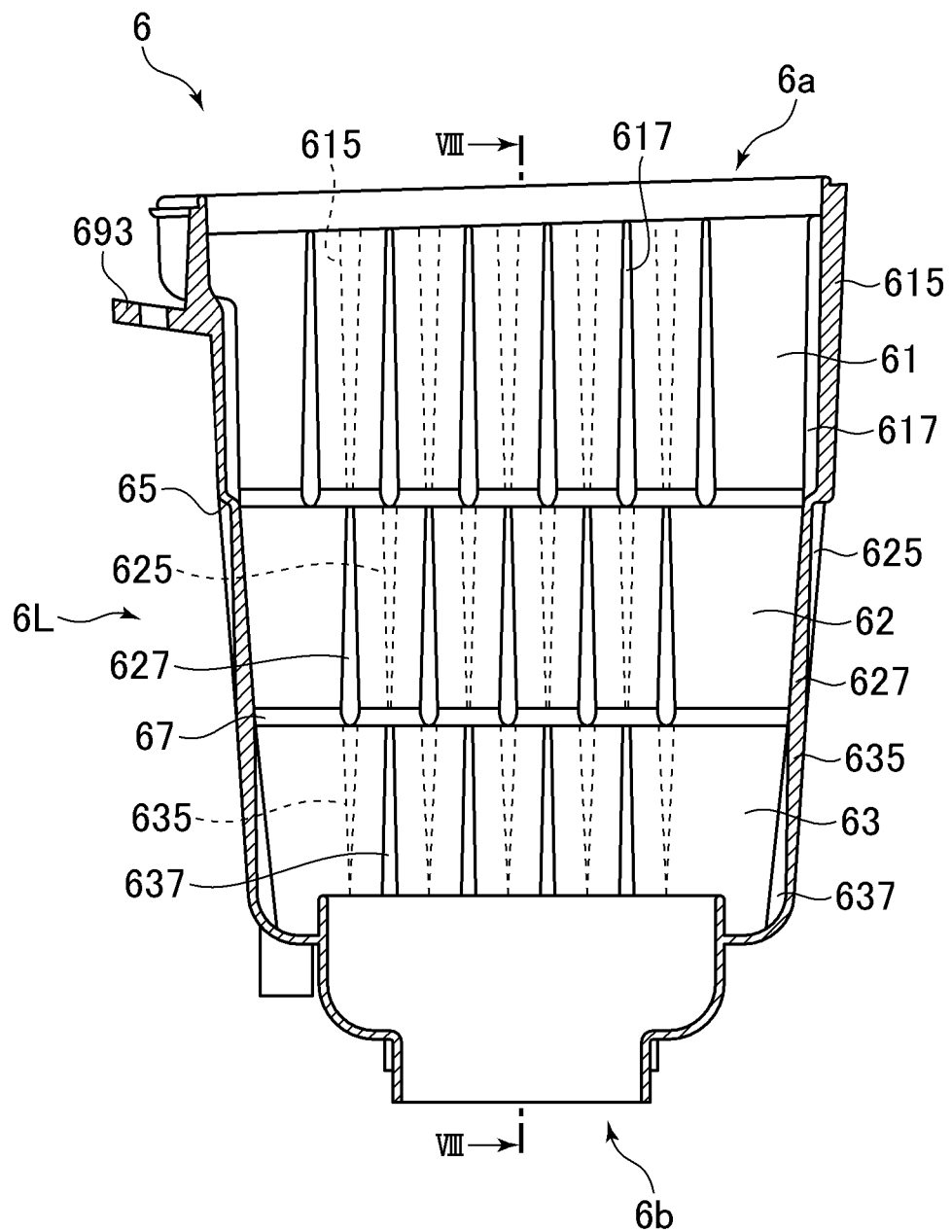
FIG. 7 is a sectional view of the case.
Figure 8:
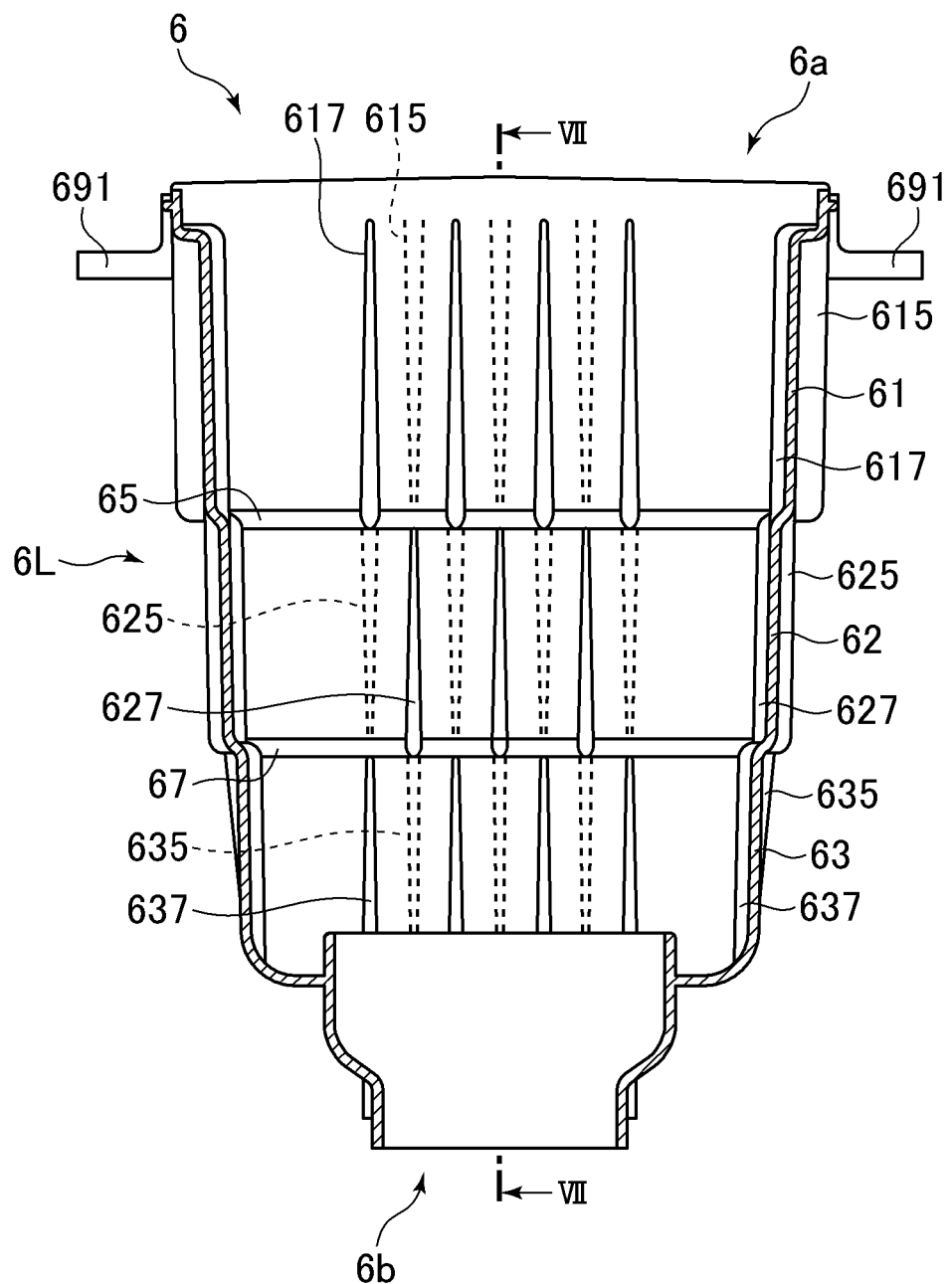
FIG. 8 is a sectional view of the case.

FIG. 5, FIG. 6, FIG. 7, and FIG. 8 are a perspective view, a plan view, a sectional view, and another sectional view, respectively, of a case 6 of the air cleaner 10. FIG. 7 is a sectional view taken along the line VII-VII of FIG. 6 or FIG. 8. FIG. 8 is a sectional view taken along the line VIII-VIII of FIG. 6 or FIG. 7.

Figure 9:
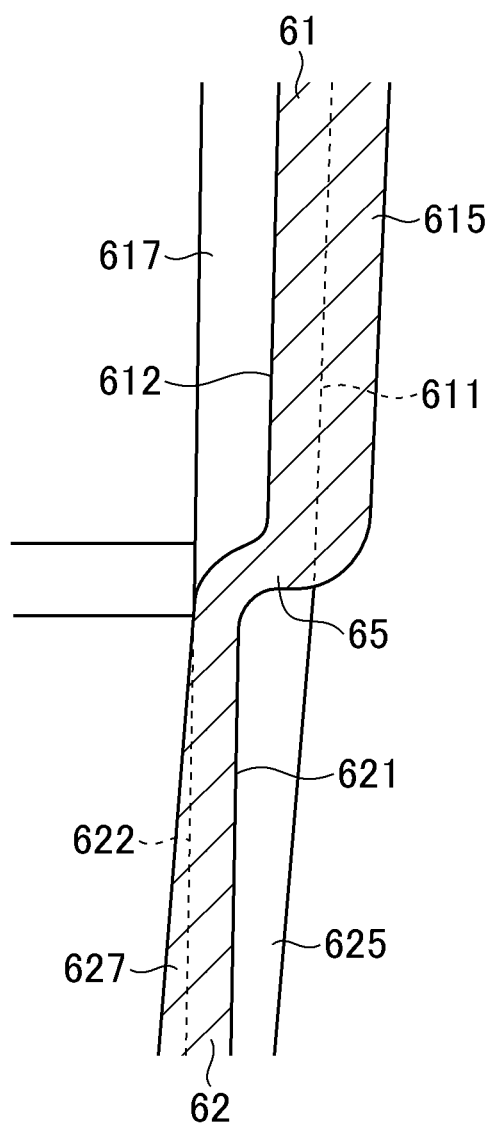
FIG. 9 is an enlarged view of relevant parts of FIG. 7.
Figure 10:
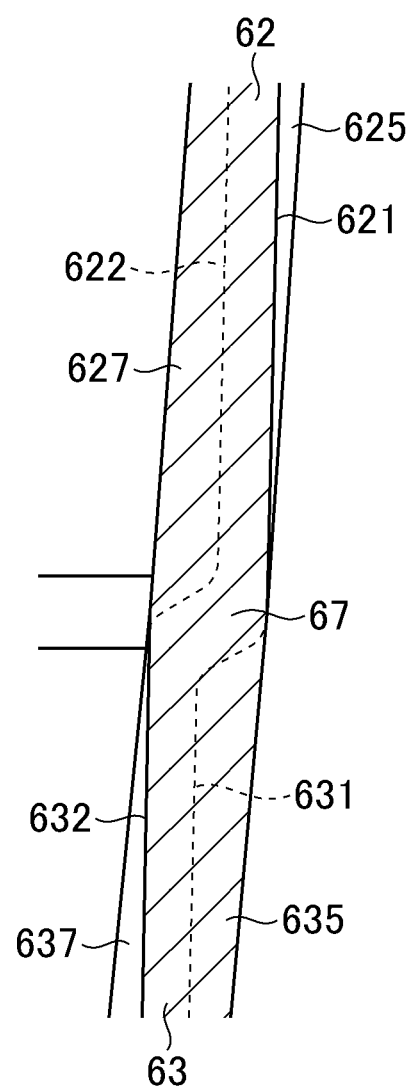
FIG. 10 is an enlarged view of relevant parts of FIG. 7.
Figure 11:
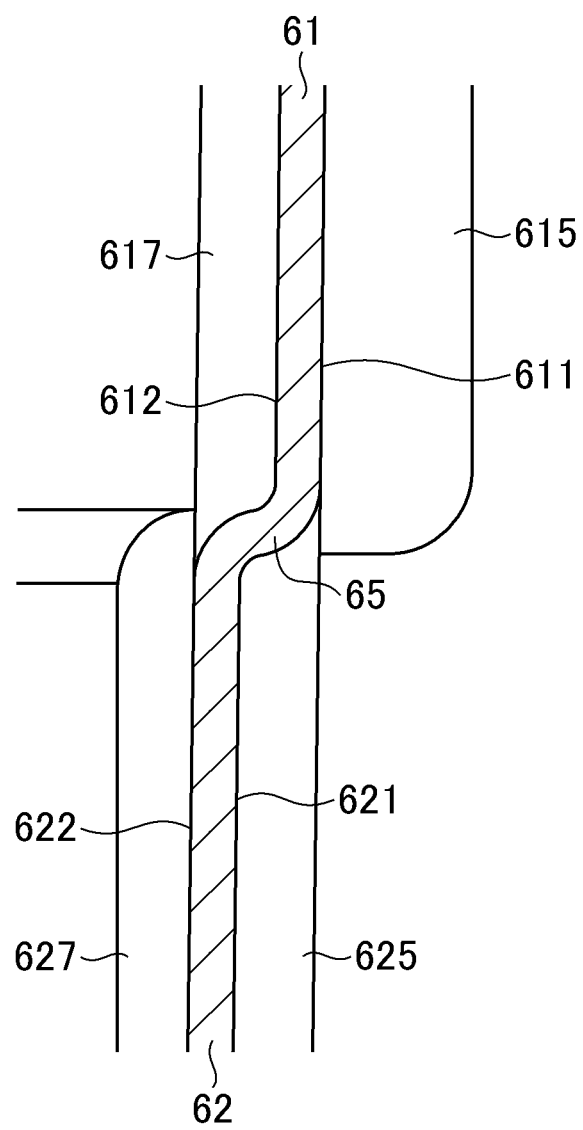
FIG. 11 is an enlarged view of relevant parts of FIG. 8.
Figure 12:
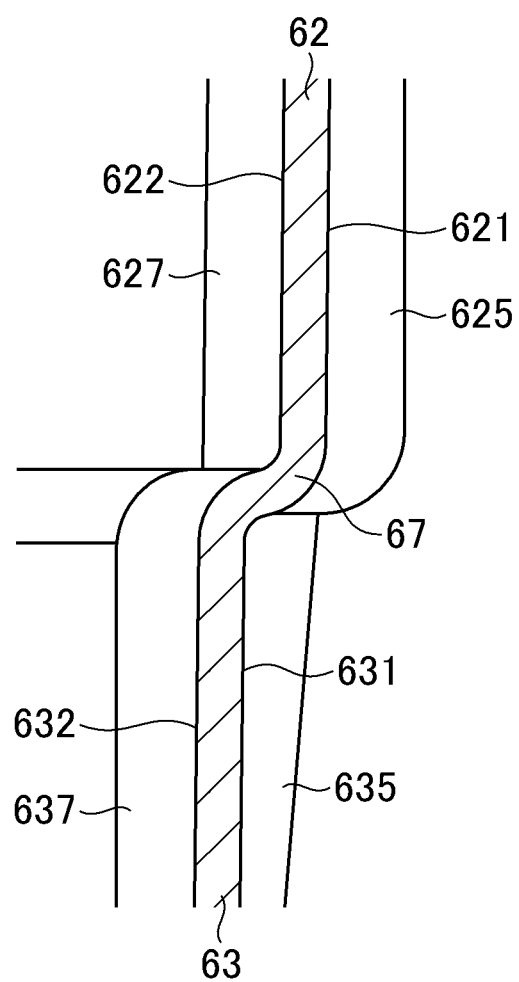
FIG. 12 is an enlarged view of relevant parts of FIG. 8.

FIG. 9 is an enlarged view of the vicinity of a stepped portion 65 of FIG. 7. FIG. 10 is an enlarged view of the vicinity of a stepped portion 67 of FIG. 7. FIG. 11 is an enlarged view of the vicinity of the stepped portion 65 of FIG. 8. FIG. 12 is an enlarged view of the vicinity of the stepped portion 67 of FIG. 8.

The air cleaner 10 is formed into a substantially rectangular parallelepiped shape so as to extend in an upward and downward direction. The air cleaner 10 is applied to the vehicle 1 such as the ROV, which is intended for use on an off-road terrain where foreign matter, such as dust, are easily kicked up around the air cleaner 10. Accordingly, in order to enhance filtering performance, a volume of air that the air cleaner 10 can process is increased in comparison to a volume of air that an air cleaner of a general vehicle, intended for use on a paved road, can process.

The air cleaner 10 includes the case 6, filter elements 83 and 87 accommodated in the case 6, and a lid 7 configured to close an opening 6a formed at an upper end of the case 6. In this embodiment, the case 6 is a molded product obtained by injection molding. The case 6 is molded using a male die and a female die that are moved relative to each other in an opening direction.

Opening 6a and opening 6b are respectively formed in the upper end and a lower end of the case 6 so as to open in the upward and downward direction of the case 6, respectively. The case 6 includes a rectangular-columnar side wall 6L having a rectangular cross-section taken along the upward and downward direction corresponding to an axial direction of the case 6. The opening 6b at the lower end of the case 6 is smaller than the opening 6a at the upper end thereof, and the side wall 6L is tapered radially inward in a stepped manner as it extends downward toward the lower end of the case 6. The intake duct 11 (see FIG. 1) is connected to the opening 6b at the lower end of the case 6.

A plurality of ribs 615, 625, 635, 617, 627, and 637 (hereinafter represented as ribs 615 to 637) are formed on an inner surface and an outer surface of the side wall 6L of the case 6 and extend in the upward and downward direction. A specific shape of the side wall 6L of the case 6 is described later.

A plurality of brackets 691 and 693 configured to connect the air cleaner 10 to a vehicle body frame of the vehicle 1 are mounted on an upper portion of the case 6 and protrude outward from the case. Further, a plurality of engagement portions 697 are formed on the upper portion of the case 6, and are engaged with fasteners 79 (see FIG. 3) configured to attach the case 6 and the lid 7 to each other.

An annular protruding edge portion 695 is formed on a lower portion of the case 6 and protrudes upward. The annular protruding edge portion 695 surrounds the opening 6b in plan view. An annular retaining member 81 configured to retain the filter element 83 inside the retaining member 81 is placed on the protruding edge portion 695, and the filter element 83 covers an upper side of the opening 6b. The retaining member 81 is fastened with screws (or other known fastening elements) to boss portions 696 (see FIG. 6) formed on the lower portion of the case 6.

Further, a tubular retaining member 85 is placed on the retaining member 81 and extends in the upward and downward direction. A plurality of through holes are formed in a side wall of the retaining member 85 so that the retaining member 85 has, for example, a honeycomb structure. The filter element 87 is arranged around the retaining member 85. A cover 89 is placed on the retaining member 85. The filter element 87 is retained by a guide portion 851, which is formed on a lower end of the retaining member 85, and a guide portion 891, which is formed on a peripheral edge portion of the cover 89, so as not to move away from the side wall of the retaining member 85.

An outside air intake passage 71, through which outside air is introduced into the air cleaner, is formed in the lid 7. The outside air intake passage 71 extends rightward from a center portion of the lid 7 to open rightward. Further, the lid 7 includes a plurality of protruding portions 73 extending downward from a lower surface of the lid 7. The protruding portions 73 are formed to surround the center portion of the lid 7, and press the peripheral edge portion of the cover 89 downward, thereby fixing the retaining member 85.

The outside air, which has flowed into the case 6 through the outside air intake passage 71 formed in the lid 7, blows against the cover 89 and is diffused radially outward, thereby flowing into a gap between the side wall 6L of the case 6 and the filter element 87. The outside air, having flowed into the gap, flows into the retaining member 85 through the filter element 87, and then reaches the opening 6b in the lower end of the case 6 after flowing through the filter element 83.

Now, a specific shape of the side wall 6L of the case 6 is described.

As illustrated in FIG. 7 and FIG. 8, the side wall 6L of the case 6 includes a first wall portion 61, a second wall portion 62, and a third wall portion 63 arrayed in the upward and downward direction. The first wall portion 61, the second wall portion 62, and the third wall portion 63 are arrayed from an upper side to a lower side of the case in the stated order.

The first wall portion 61 and the second wall portion 62 are continuous with each other through intermediation of the stepped portion 65. The second wall portion 62 and the third wall portion 63 are continuous with each other through intermediation of the stepped portion 67.

Further, the second wall portion 62 is positioned radially outward of the third wall portion 63, and the first wall portion 61 is positioned radially outward of the second wall portion 62. In other words, the second wall portion 62 is positioned radially inward of the first wall portion 61, and the third wall portion 63 is positioned radially inward of the second wall portion 62.

More specifically, an outer surface 611 of the first wall portion 61 and an outer surface 621 of the second wall portion 62 are continuous with each other through intermediation of the stepped portion 65. An inner surface 612 of the first wall portion 61 and an inner surface 622 of the second wall portion 62 are also continuous with each other through intermediation of the stepped portion 65 (see FIG. 9 and FIG. 11). The outer surface 621 of the second wall portion 62 and an outer surface 631 of the third wall portion 63 are continuous with each other through intermediation of the stepped portion 67, and the inner surface 622 of the second wall portion 62 and an inner surface 632 of the third wall portion 63 are also continuous with each other through intermediation of the stepped portion 67 (see FIG. 10 and FIG. 12).

Further, the outer surface 611 of the first wall portion 61 is positioned radially outward of the outer surface 621 of the second wall portion 62. The inner surface 612 of the first wall portion 61 is also positioned radially outward of the inner surface 622 of the second wall portion 62 (see FIG. 9 and FIG. 11). Further, the outer surface 621 of the second wall portion 62 is positioned radially outward of the outer surface 631 of the third wall portion 63. The inner surface 622 of the second wall portion 62 is also positioned radially outward of the inner surface 632 of the third wall portion 63 (see FIG. 10 and FIG. 12).

Each of the stepped portions 65 and 67 is a portion of the side wall 6L bent into a stepped shape. That is, each of the stepped portions 65 and 67 is a portion including two bent portions, namely, a bent portion extending in the upward and downward direction and then in a horizontal direction of the side wall 6L, and another bent portion extending in the horizontal direction and then in the upward and downward direction. Each of the stepped portions 65 and 67 is formed entirely around the side wall 6L in a peripheral direction of the side wall 6L. However, the present invention is not limited thereto. Each of the stepped portions 65 and 67 may be formed partially around the side wall 6L in the peripheral direction thereof.

The plurality of ribs 615 to 637 are formed on the first wall portion 61, the second wall portion 62, and the third wall portion 63 of the side wall 6L and extend in the upward and downward direction. Specifically, the ribs 615 are formed on the outer surface 611 of the first wall portion 61. The ribs 625 are formed on the outer surface 621 of the second wall portion 62. The ribs 635 are formed on the outer surface 631 of the third wall portion 63. Further, the ribs 617 are formed on the inner surface 612 of the first wall portion 61. The ribs 627 are formed on the inner surface 622 of the second wall portion 62. The ribs 637 are formed on the inner surface 632 of the third wall portion 63.

The ribs 615 and 617 of the first wall portion 61 are formed within the first wall portion 61, and are not continuous with the second wall portion 62 across the stepped portion 65.

The ribs 625 and 627 of the second wall portion 62 are also formed within the second wall portion 62. The ribs 625 and 627 are not continuous with the first wall portion 61 across the stepped portion 65, and are not continuous with the third wall portion 63 across the stepped portion 67. The ribs 635 and 637 of the third wall portion 63 are also formed within the third wall portion 63, and are not continuous with the second wall portion 62 across the stepped portion 67.

The case 6 is the molded product obtained by injection molding. Accordingly, the ribs 615 to 637 each have a tapered shape having a thickness and a height that decrease as each rib extends in a die releasing direction. That is, the ribs 615, 625, and 635 formed on the outer surfaces of the side wall 6L each have a tapered shape having a thickness and a height that decrease as each rib extends downward, and the ribs 617, 627, and 637 formed on the inner surfaces of the side wall 6L, each have a tapered shape having a thickness and a height that decrease as each rib extends upward.

Further, the stepped portions 65 and 67 are formed on the side wall 6L. Thus, the ribs 615 and 617, the ribs 625 and 627, and the ribs 635 and 637 are formed easily and separately on the first wall portion 61, the second wall portion 62, and the third wall portion 63, respectively.

Specifically, the ribs 625 on the outer surface 621 of the second wall portion 62 are continuous with the stepped portion 65 positioned above the second wall portion 62, and the ribs 625 extend downward from the stepped portion 65. Thus, because no undercut is formed, the ribs 625 can be formed on the outer surface 621 of the second wall portion 62 without continuously extending the ribs 625 from the outer surface 611 of the first wall portion 61. Further, heights of the ribs 625 are equal to or smaller than a height of the stepped portion 65. The height of the stepped portion 65 in this embodiment corresponds to a difference in level between the outer surface 611 of the first wall portion 61 and the outer surface 621 of the second wall portion 62. In this embodiment, the ribs 625 are formed so that top surfaces of the ribs 625 are continuous with the outer surface 611 of the first wall portion 61.

Similarly, the ribs 635 on the outer surface 631 of the third wall portion 63 are continuous with the stepped portion 67 positioned above the third wall portion 63, and the ribs 635 extend downward from the stepped portion 67. The ribs 627 on the inner surface 622 of the second wall portion 62 are continuous with the stepped portion 67 positioned below the second wall portion 62, and the ribs 627 extend upward from the stepped portion 67. The ribs 617 on the inner surface 612 of the first wall portion 61 are continuous with the stepped portion 65 positioned below the first wall portion 61, and the ribs 617 extend upward from the stepped portion 65.

A distal end of each of the ribs 615 to 637 in the die releasing direction may be formed into, for example, a shape of each rib 615 on the outer surface 611 of the first wall portion illustrated in FIG. 9, such that a height of each rib is sharply reduced to zero in the vicinity of the stepped portion 65. Alternatively, the distal end of each of the ribs 615 to 637 may be formed into, a shape of each rib 625 on the outer surface 621 of the second wall portion 62 illustrated in FIG. 10, such that the height of each rib is gradually reduced to zero until each rib reaches the stepped portion 67.

The ribs 615 on the outer surface 611 of the first wall portion 61 and the ribs 625 on the outer surface 621 of the second wall portion 62 are arranged alternately along a peripheral direction of the case. For example, one of the ribs 625 on the outer surface 621 of the second wall portion 62 may be at an intermediate position between two adjacent ribs 615 on the outer surface 611 of the first wall portion 61. One of the ribs 615 on the outer surface 611 of the first wall portion 61 may be at an intermediate position between two adjacent ribs 625 on the outer surface 621 of the second wall portion 62.

Similarly, the ribs 625 on the outer surface 621 of the second wall portion 62 and the ribs 635 on the outer surface 631 of the third wall portion 63 are arranged alternately along the peripheral direction of the case. The ribs 617 on the inner surface 612 of the first wall portion 61 and the ribs 627 on the inner surface 622 of the second wall portion 62 are also arranged alternately along the peripheral direction. The ribs 627 on the inner surface 622 of the second wall portion 62 and the ribs 637 on the inner surface 632 of the third wall portion 63 are also arranged alternately along the peripheral direction.

The ribs 615 on the outer surface 611 of the first wall portion 61 and the ribs 617 on the outer surface 612 of the first wall portion 61 are arranged alternately along the peripheral direction of the case. For example, one of the ribs 617 on the inner surface 612 of the first wall portion 61 may be at the intermediate position between two adjacent ribs 615 on the outer surface 611 of the first wall portion 61. One of the ribs 615 on the outer surface 611 of the first wall portion 61 may be at an intermediate position between two adjacent ribs 617 on the inner surface 612 of the first wall portion 61.

Similarly, the ribs 625 on the outer surface 621 of the second wall portion 62 and the ribs 627 on the inner surface 622 of the second wall portion 62 are arranged alternately along the peripheral direction of the case. The ribs 635 on the outer surface 631 of the third wall portion 63 and the ribs 637 on the inner surface 632 of the third wall portion 63 are also arranged alternately along the peripheral direction.

The ribs 615 on the outer surface 611 of the first wall portion 61, the ribs 627 on the inner surface 622 of the second wall portion 62, and the ribs 635 on the outer surface 631 of the third wall portion 63 may be aligned in the upward and downward direction. Further, the ribs 617 on the inner surface 612 of the first wall portion 61, the ribs 625 on the outer surface 621 of the second wall portion 62, and the ribs 637 on the inner surface 632 of the third wall portion 63 may be also aligned in the upward and downward direction.

According to the embodiment described above, the ribs 615 and 617, the ribs 625 and 627, and the ribs 635 and 637 are formed on the first wall portion 61, the second wall portion 62, and the third wall portion 63, respectively. Accordingly, moldability can be enhanced while preventing an increase in a size of the ribs. That is, when increasing the size of a case and ribs are formed to extend throughout the case, it is inevitable that the proximal ends of the ribs are thickened.

Thus, there is a problem in that a strain is easily caused by sink marks, thereby causing a difficulty in securing accuracy of dimension of the case. In addition, there is also a problem in that when a molding cooling time period is extended, manufacturing costs are increased. In contrast to the forgoing example, in this embodiment, the ribs 615 and 617, the ribs 625 and 627, and the ribs 635 and 637 are respectively and separately formed on the first wall portion 61, the second wall portion 62, and the third wall portion 63. Accordingly, it is unnecessary to thicken the proximal ends of the ribs 615 to 637. Thus, the above-mentioned problems do not arise, and moldability of the case 6 is improved.

There is a concern that a wall of a large-sized case vibrates easily. This vibration thereby reducing a silencing action on noises generated by an internal combustion engine. Thus, it is necessary to secure rigidity of an air cleaner case. To counter the above vibration concerns, according to one embodiment, the stepped portions 65 and 67 are formed on the side wall 6L. Accordingly, without increasing the heights of the ribs 615 to 637, rigidity of the case can be increased in a direction that extends along the stepped portions 65 and 67. It is more difficult, for the ribs extending in one direction, to secure rigidity in an arraying direction of the ribs than to secure rigidity in the extending direction of the ribs. Accordingly, in order to secure rigidity in the arraying direction of the ribs, it is necessary to increase the heights of the ribs, or to narrow intervals between the ribs. However, there is a problem in that a limitation is imposed on an arrangement space for the filter elements or the like accommodated inside the case, or that a limitation is imposed on an arrangement space for a component arranged around the case. In contrast to this problem, in one embodiment, the stepped portions 65 and 67 are formed. Accordingly, without increasing the heights of the ribs 615 to 637, rigidity can be increased also in the extending direction of the stepped portions 65 and 67, that is, the arraying direction of the ribs 615 to 637.

While the embodiment of the present invention has been described above, it is to be understood that the present invention is not limited to the embodiment described above and may be subjected to various modifications by a person skilled in the art.

In the above-mentioned embodiment, the ribs 615, 625, and 635 are formed on the outer surfaces of all of the first wall portion 61, the second wall portion 62, and the third wall portion 63 of the side wall 6L, but the present invention is not limited thereto. The ribs may be formed on only one or more of the wall portions. The same holds true for the inner surfaces of the side wall 6L.

Further, in the above-mentioned embodiment, the ribs 615 and the ribs 617 are respectively formed on both of the outer surface 611 and the inner surface 612 of the first wall portion 61, but the present invention is not limited thereto. The ribs may be formed on only one or more of the outer surface 611 and the inner surface 612 of the first wall portion 61. The same holds true for the second wall portion 62 and the third wall portion 63.

Further, in the above-mentioned embodiment, the ribs 615 and the ribs 617 are respectively formed on a front portion, a rear portion, a left portion, and a right portion of the first wall portion 61, but the present invention is not limited thereto. The ribs may be formed on only one or more of the front portion, the rear portion, the left portion, and the right portion of the first wall portion 61. The same holds true for the second wall portion 62 and the third wall portion 63.

Further, in the above-mentioned embodiment, each of the stepped portions 65 and 67 is formed entirely around the side wall 6L in the peripheral direction of the side wall 6L, but the present invention is not limited thereto. The stepped portion may be formed partially around the side wall 6L in the peripheral direction thereof, that is, formed on only one or more of a front portion, a rear portion, a left portion, and a right portion of the side wall 6L.

Further, in the above-mentioned embodiment, each of the stepped portions 65 and 67 is the portion of the side wall 6L bent into a stepped shape, and there are differences in level between the outer surfaces of the side wall 6L and between the inner surfaces of the side wall 6L. However, the present invention is not limited thereto. The stepped portion is formed on only any one of a region including the outer surfaces and a region including the inner surfaces, and another one of the regions including the outer surfaces and the region including the inner surfaces may be level.

Although the present invention has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. An air cleaner, comprising:
   a filter element;
   a case having an opening configured to accommodate the filter element; and
   a lid configured to close the opening,
   the case comprising:
     a wall comprising a first surface and a second surface that are formed on at least one of an outer surface and an inner surface of the case and are continuous with each other in an opening direction of the opening through intermediation of a stepped portion; and
     a rib extending in the opening direction and formed on at least one of the first surface and the second surface.

2. The air cleaner according to claim 1, wherein the stepped portion is formed to extend in a peripheral direction when the opening direction is in an axial direction.

3. The air cleaner according to claim 1, wherein the first surface is closer to the opening than the second surface, and the first surface is positioned radially outward of the second surface when the opening direction is in an axial direction.

4. The air cleaner according to claim 1, wherein the first surface, the second surface, and the stepped portion of the wall are formed on each of the outer surface and the inner surface of the case.

5. The air cleaner according to claim 4, wherein the wall is bent into a stepped shape.

6. The air cleaner according to claim 1, wherein the wall further comprises a third surface that is continuous with one of the first surface and the second surface through intermediation of the stepped portion in the opening direction.

7. The air cleaner according to claim 1, wherein the rib is formed on each of the first surface and the second surface.

8. The air cleaner according to claim 7, wherein the rib formed on the first surface and the rib formed on the second surface are arranged alternately along a peripheral direction when the opening direction is in an axial direction.

9. The air cleaner according to claim 1, wherein the rib is continuous with the stepped portion.

10. The air cleaner according to claim 7, wherein a height of the rib is equal to or smaller than a height of the stepped portion.

11. The air cleaner according to claim 1, wherein the rib is formed on each of the outer surface and the inner surface of the case.

12. The air cleaner according to claim 11, wherein the rib formed on the outer surface and the rib formed on the inner surface are arranged alternately along a peripheral direction when the opening direction is in an axial direction.

13. The air cleaner according to claim 1,
   wherein the wall comprises a plurality of wall portions that are continuous with each other in a peripheral direction when the opening direction is in an axial direction, and
   wherein the rib is formed on each of at least two of the plurality of wall portions.

14. A vehicle, comprising the air cleaner of claim 1.

15. The vehicle according to claim 14, further comprising a plurality of seats arrayed in a vehicle width direction.

16. The vehicle according to claim 14, further comprising an engine arranged rearward of a seat on which a driver sits.

17. The vehicle according to claim 14, further comprising a steering wheel.

* * * * *